United States Patent

McCullough

[15] 3,644,136
[45] Feb. 22, 1972

[54] PROCESS FOR IMPROVING THE ADHESION OF POLYESTER FIBROUS MATERIAL TO RUBBER

[72] Inventor: Robert W. McCullough, Riverside, Conn.
[73] Assignee: Collins and Aikman Corporation, New York, N.Y.
[22] Filed: Nov. 4, 1969
[21] Appl. No.: 874,043

[52] U.S. Cl. .......................... 117/47 A, 117/63, 117/76 T, 117/102 R, 117/102 A, 117/106 R, 117/138.8 F, 117/161 UD, 117/161 UF, 117/162
[51] Int. Cl. .................................. B44d 1/092, B32b 25/08
[58] Field of Search .................. 117/138.8 F, 138.8 N, 47 A, 117/102 A, 102 R, 106 R

[56] References Cited

UNITED STATES PATENTS

| | | | |
|---|---|---|---|
| 2,702,254 | 2/1955 | Dowd | 117/102 R X |
| 3,245,937 | 4/1966 | Wagner | 117/138.8 F X |
| 3,383,242 | 5/1968 | Macura et al. | 117/138.8 F |
| 3,447,953 | 6/1969 | Gebauer et al. | 117/106 R |
| 3,515,567 | 6/1970 | Tani et al. | 117/47 A X |

FOREIGN PATENTS OR APPLICATIONS

| | | | |
|---|---|---|---|
| 805,525 | 12/1958 | Great Britain | 117/138.8 F |

Primary Examiner—William D. Martin
Assistant Examiner—Ralph Husack
Attorney—Paul & Paul

[57] ABSTRACT

Polyester fibrous materials are provided which have improved adhesion to rubber. The polyester fibrous materials of this invention are obtained by treating the polyesters in the form of fibers, filaments, yarns or fabrics with halogenated aromatic hydrocarbon at an elevated temperature for a short period of time and then advantageously removing substantially all of the halogenated aromatic hydrocarbon from the treated material. The polyester fibers prepared in accordance with this invention are especially useful as reinforcement for rubber products such as tires, conveyor belts and the like.

8 Claims, No Drawings

PROCESS FOR IMPROVING THE ADHESION OF POLYESTER FIBROUS MATERIAL TO RUBBER

BACKGROUND OF THE INVENTION

1. Field of the Invention

This invention is concerned with polyester fibers having improved adhesion to rubber and to the process for obtaining these fibers.

2. Description of the Prior Art

Polyester fibrous materials, for example polyethylene terephthalate in fibrous form having high tensile strengths are waterproof and have excellent heat resistance. Because of these properties, the polyester fibers are excellent materials for use as reinforcements for rubber products such as tires, conveyor belts and the like. The polyester fibers, however, exhibit inherently poor bonding properties especially with respect to rubber. The techniques and adhesive compositions heretofore used to improve the bonding of other fibrous materials such as nylon and rayon fibers are ineffective when used on polyester materials. One of the most widely used compositions employed to improve the adhesion of nylon and rayon is a mixture of alkaline precondensates of resorcinol and formaldehyde. However, the alkaline precondensates when used on polyesters are not effective.

Various methods have been suggested in the prior art to improve the bonding of the polyesters to rubber. Compounds such as polyepoxide and isocyanate derivatives and compositions such as those disclosed in Belgian Pat. No. 688,424 or combinations of these materials with the prior art condensates noted above have been indicated to improve somewhat the bonding of polyester to rubber. The use of certain of these materials requires a multiple-dip process. The polyepoxide and isocyanate derivatives, for example, had to be applied in a first dip and then a resorcinol formaldehyde condensate applied in a second dip. The compositions such as those disclosed in Belgian Pat. No. 688,424 can be applied in a single dip but are rather expensive to manufacture and tend to stiffen the treated polyester fibers.

The cost of all of the methods suggested in the prior art methods for improving the bonding were somewhat expensive and the necessity of employing multiple-step processes increase both the equipment cost and labor cost. The increase in adhesion obtained by the prior art processes, in addition, was often somewhat marginal.

A further problem of the prior art processes was that the waste from the yarn and fabric production operations could not be salvaged and sold for use in other textile products since the adhesive coatings adversely effected the properties, especially the dyeability of the materials. The reduction in the value of the scrap materials to some extent increased the cost of the final product.

It is an object of the present invention to overcome the aforementioned problems and difficulties encountered in the prior art.

It is a still further object of this invention to provide polyester fibers having improved adhesion to rubber.

It is a still further object to provide a process for the manufacturing of polyester fibers having improved adhesion to rubber which is efficient, relatively inexpensive and which does not adversely effect the properties of the treated fibers.

Other objects and advantages of this invention will become apparent from a further reading of the specification and subjoined claims.

SUMMARY OF THE INVENTION

The objects of this invention are achieved by treating the polyester fibers with a halogenated aromatic hydrocarbon at an elevated temperature for a short period of time and then removing the halogenated aromatic hydrocarbon from the treated polyester fibers.

DESCRIPTION OF THE PREFERRED EMBODIMENTS

The fibrous materials which are treated in accordance with the present invention are made from synthetic linear polyesters which are the condensation polymerization products of dicarboxylic acids and polyhydric alcohols. The repeating structural units of the polymer chain include at least one divalent carbocylic ring containing at least six carbon atoms which is present as an integral part of the polymer chain and have a minimum of four carbon atoms between the points of attachment of the ring in the polymer chain. The preferred synthetic linear polyesters are of the polyethylene terephthalate type. Other types of polyesters are likewise employable such as those obtained by polymerizing a dicarboxylic acid, bromoterephthalic acid, 4,4'-benzophenonedicarboxylic acid and so forth with glycols such as those of the formula $HO(CH_2)_nOH$ wherein $n$ is a whole number from 2 to 10 such as diethylene glycol, neopentylene glycol and the like.

The polyester fibrous materials when treated in accordance with this invention may be in various forms. The polyester fibers may be treated as continuous filament, or as chopped tow. The fibers may also be spun into yarns or woven into fabrics and then treated. When referring to yarns, this is intended to include filament yarns, spun yarns, and the like. The yarns and fabrics that are treated according to this invention preferably consist of only polyester fibers. However, it is possible to treat polyesters in blends with other fibers by the present invention providing the other fibers are not adversely affected.

The halogenated aromatic hydrocarbons which are employed in the present invention may be monocyclic or bicyclic hydrocarbons with the monocyclic hydrocarbons being preferred. The halogenated aromatic hydrocarbons are represented by the formula

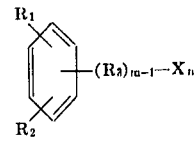

Formula I wherein $R_1$ and $R_2$ are the same or different and represent hydrogen, an alkyl having one to four carbon atoms such as methyl, ethyl, n-propyl, isopropyl, and n-butyl or an alkenyl having two to four carbon atoms such as vinyl, 1-propenyl and 2-butenyl. When $R_1$ and $R_2$ are attached to vicinal carbon atoms they may be attached to each other to form a five-to-six-membered aliphatic or aromatic ring when taken together with the vicinal carbon atoms of the aromatic ring of the compound of Formula I, with the naphthalene ring system being the preferred ring system when $R_1$ and $R_2$ are joined together, $R_3$ is a lower alkylene having one to four carbon atoms such as methylene, ethylene, propylene and butylene, or an arylene radical, preferably a phenylene radical such as 1,4-phenylene. The symbol X in the above formula stands for a halogen such as fluorine, chlorine, bromine or iodine, $n$ is a whole number from 1 to 3 and when $n$ is two or more X can stand for the same or different halogens and $m$ is a whole number from 1 and 2.

The process of the present invention is conducted in either the liquid phase or vapor phase as will be explained later in greater detail.

The halogenated aromatic hydrocarbon employed in the liquid phase method of the present invention should have a melting point of below 120° C. and be a liquid at the desired treating temperature. The ideal halogenated aromatic hydrocarbon compounds for employment in the present invention melt at a temperature below 130° C. and have a boiling point above 160° C. and more preferably above 200° C. The halogenated aromatic hydrocarbon should be substantially anhydrous. However, it can contain minor amounts of water and will tend to pick up small amounts of water from the polyester being treated. Since the treatment is conducted at elevated temperatures, the water is volatilized and removed from the treating bath.

The halogenated aromatic hydrocarbons employed in the vapor phase should vaporize at a temperature below the shrink or decomposition temperature of the polyester to be treated. The preferred halogenated aromatic hydrocarbons for employment in this invention should volatilize at a temperature above 120° C. but below 180°-200° C.

Blends of halogenated aromatic hydrocarbons can be employed if desired; however, it is preferable to employ a single compound, especially in the vapor-phase method, as it facilitates the separation and recovery of the halogenated aromatic hydrocarbon as will be more specifically set out below.

The preferred halogenated aromatic hydrocarbons for employment in this invention are represented by the formula

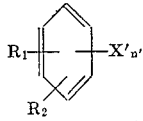

Formula II wherein X' is chlorine or bromine and $n'$ is a whole number from 1 to 3.

The mono-halogenated compounds wherein $R_1$ and $R_2$ are hydrogen, that is the mono-halo-benzenes, are especially useful in the vapor-phase method.

The mono-halogenated benzenes are generally not employed in the liquid-phase treating method because of their relatively low boiling points but can be employed in the liquid phase if the process is conducted at a temperature below the boiling point or under pressure conditions. Even if the process is conducted at normal pressures, mono-halogenated compounds such as bromobenzene and iodobenzene can be employed in the liquid process to some advantage.

The dihalogenated benzenes on the other hand, are quite useful in both the liquid and vapor process of the present invention and are one of the preferred class of compounds. All of the isomers of the dihalogenated benzenes such as the dichloro, the dibromo and diiodo benzenes give excellent results. The mixed dihalogenated compounds, such as, m- and p-bromochlorobenzenes and the iodobromo benzene compounds, such as the ortho and meta isomers are likewise useful in the present invention.

The most important class of compounds for employment in the liquid process of the present invention are the trihalogenated benzenes. All of the isomers of the trichloro benzenes, such as the 1,2,3-trichloro, 1,2,4-trichloro and the 1,3,5-trichloro benzenes are the most preferred compounds for employment in the liquid process. The other trihalogenated benzenes, such as the trifluoro, the tribromo and triiodo and the various mixed halogen compounds are likewise useful and are also in the preferred class compounds. The trihalogenated aromatic hydrocarbons are preferably not employed in the vapor phase because of their higher boiling points.

Of the compounds wherein $R_1$ and $R_2$ represent alkyls having one to four carbon atoms, by far the most important class of compounds are the halogenated toluenes and halogenated xylene compounds, with even the monohalogenated compounds, such as the chlorotoluenes and bromoxylenes, being quite suitable for use in even the liquid-phase method.

Of the compounds wherein $R_1$ and $R_2$ are attached to each other to form a five-to-six-membered ring, particular attention is directed to the halogenated compounds of the naphthalene series such as the monohalogenated naphthalenes and the dihalogenated naphthalenes such as 1,2,-dichloro, 1,3-dichloro and 1,4-dichloro naphthalenes.

Of the compound where $R_3$ is a lower alkylene and $m$ is 2, particular attention is directed to compounds such as benzylchloride, $\alpha$ chlorotoluene, $\alpha$-o-dichlorotoluene, bromotoluene and $\alpha$ bromo-o-xylene.

The selection of the particular halogenated aromatic hydrocarbon is dependent on various factors such as the desired treatment temperatures, phase, cost and commercial availability of the compound, and the resulting improvement in the properties of the polyester. By comparing all of these factors, it has been found that the trichlorobenzenes are clearly the preferred compounds for employment in the liquid phase treatment.

In the method of this invention the synthetic linear polyester is treated with the halogenated aromatic hydrocarbon for a short period of time at an elevated temperature. More particularly, in the liquid-phase method, the polyester is passed through a bath of the halogenated aromatic hydrocarbon at a temperature of 120° to 200° C. at a speed such that immersion time in the halogenated aromatic hydrocarbon is from $10^{-4}$ to 20 seconds. Generally, a treatment temperature between 130° C. and 160° C. is sufficient in order to obtain the desired improvement in adhesion and does not cause shrinkage or degradation of the polyester polymers. Shorter immersion times can be employed. It has been found, however, that about 10 seconds gives the optimum results. Immersion times in excess of 20 seconds can be employed, but no advantage is obtained with the longer treatment times.

In the vapor-phase treatment, the polyester material to be treated is fed through a vapor of the halogenated aromatic hydrocarbon. In the preferred embodiment, the vapor is heated to a temperature where the vapor will condense in a thin film on the polyester which is fed into the vapor. Since it is most convenient to keep the polyester at room temperature before treatment, the vapor should be maintained at a temperature wherein it will condense on the room temperature polyester material. The process can also be conducted by maintaining the temperature of both the polyester and the halogenated hydrocarbon vapor sufficiently high so that there is no substantial amount of condensation. The treatment time should be relatively short with times of $10^{-4}$ seconds to 10 seconds being quite sufficient.

After the treating step, all or substantially all of the halogenated aromatic hydrocarbon remaining on the polyester fibrous material is advantageously removed preferably by extraction. The extraction is advantageously conducted by passing the treated polyester through a solvent with which the halogenated aromatic hydrocarbon is miscible and which has a boiling point that is substantially different and preferably lower than the boiling point of the halogenated aromatic hydrocarbon in order to facilitate the separation and recovery of the materials. Solvents which have proven to be especially valuable as extraction medium are the halogenated aliphatic hydrocarbons, such as methylene chloride, trichloroethylene, 1,1,1-trichloroethane, perchlorethylene and mixtures thereof. The extraction is preferably conducted in a series of steps. This is advantageously conducted by passing the treated material through a series of degreasers in which the extraction medium is flowing counter to the direction of advancement of the treated material. The extraction medium is then removed by passing the material through a heated zone, for example, an oven or a set of can dryers. Both the halogenated aromatic hydrocarbon and the extraction medium are then recovered, purified and reused.

An alternate method of removing the halogenated aromatic hydrocarbon which has proven to be quite satisfactory is to pass the treated material through a vacuum chamber which causes the treating medium to volatilize off the polyester. This method is particularly useful when employing the vapor-phase treating method.

It should be noted that it is not essential that all of the halogenated aromatic hydrocarbon be removed from the polyester material after treatment. Some of the halogenated aromatic hydrocarbon treating agent may be entrapped in the fibrous structure during treatment. The amount of entrapped treating agent can be as high as 5-10 percent based on the weight of the fiber without adversely effecting the adhesion properties of the treated polyester material. However, it should be noted that all of the treating agent which is on the surface of the fiber or which can be simply removed by solvent extraction or vacuum extraction should be removed in order to prevent formation of blisters in the final product when the product is subjected to elevated temperature.

The treated polyester, whether in the form of fiber, yarn or fabric, after treatment, shows a substantial improvement in the degree of adhesion of the polyester fibers to rubbers. In addition, the other desirable properties such as tensile strengths are not adversely effected. In particular, it should be noted that the flexibility of the treated material is not altered. A further advantage of this process is that the scrap material can be reclaimed and reused in other textile products. Most of the properties of the reclaimed fiber are similar to those of the virgin material with the dyeability being substantially improved. It can readily be seen from the above disclosure that the process of the present invention requires a minimal amount of relatively inexpensive materials and the process is rapid requiring a minimal amount of labor.

The treated polyester fibers can be used as reinforcements for various types of rubbers, such as natural rubber, styrene-butadiene rubber, acrylonitrile-butadiene rubber, polybutadiene rubber, polyisoprene rubber and polychloroprene rubber. The rubber composition can contain the usual additive such as fillers, vulcanizing agents, accelerators for curing, softners and antioxidants.

The treated polyester fiber, yarns and fabric can be used without any precoating as is required in the prior art. The results obtained are quite satisfactory with increases in bond strength of 20–100 percent being readily obtained. If desired, the polyester materials can be precoated with a bonding assistance such as the resorcinol formaldehyde derivatives noted above. The precoating is especially useful when the reinforcement material is comprised of a blend of polyester fibers with another fiber such as nylon. In order to insure maximum contact between the polyester fibers and rubber composition, the polyester can be coated with a thin coating of a rubber latex. It should be noted, however, that precoating is optional and is not required in order to obtain improved adhesion.

The fibrous polyester material can be used as reinforcement for rubber material by casting the uncured rubber composition about the polyester fibrous material and then vulcanizing the rubber composition. The polyester can also be used as a reinforcement between cured rubber sections by using an adhesive which causes a solvent softening of the rubber compositions with a resultant adhesion between the rubber materials. Other similar methods can of course be employed.

The following examples are given by way of illustration and not intended to limit the scope of the subjoined claims. All percentages are percents by weight, not percent by volume, unless otherwise noted.

EXAMPLE 1

Ten gram skeins of 1,000-denier polyethylene terephthalate tire cord (commercially known as Encron) were prepared. The skeins were cut in half. One half of the skein was retained as the untreated sample. The other half of the skein was treated in accordance with the present invention by passing the yarn through a bath of the halogenated aromatic hydrocarbon for the time and at the temperature noted below. Each sample was solvent extracted with perchloroethylene and dried.

| Sample | Halogenated Aromatic Hydrocarbon | Time Sec. | Temperature °C. |
|---|---|---|---|
| a | 1,3,5-trichlorobenzene | 10 | 160° |
| b | 1,2,4-trichlorobenzene | 5 | 160° |
| c | 1,2,4-trichlorobenzene | 10 | 160° |
| d | 1,2,4-trichlorobenzene | 20 | 160° |
| e | α p-dichlorotoluene | 10 | 160° |
| f | o-dibromobenzene | 10 | 160° |
| g | p-bromotoluene | 5 | 160° |

All samples were measured before and after treatment and there were no significant changes in either length, tensile strength or flexibility. There was a slight increase in the weight of the samples in order of 0.05–1.25 percent based on weight of the untreated material adjusted for loss of spinning lubricants and moisture.

EXAMPLE 2

Example 1 was repeated with the exception that the sample was treated with the below-noted halogenated aromatic hydrocarbons at the times and temperatures noted below.

| Sample | Halogenated Aromatic Hydrocarbon | Time Sec. | Temperature °C. |
|---|---|---|---|
| a | monochlorobenzene | $10^{-4}$ | 180° |
| b | monochlorobenzene | 1 | 180° |
| c | monochlorobenzene | 10 | 180° |
| d | 1,2-dichlorobenzene | 5 | 200° |
| e | 1,3-dichlorobenzene | 5 | 200° |
| f | α-o-dichlorotoluene | 10 | 180° |
| g | p-fluorotoluene | 5 | 180° |

All samples were measured before and after treatment and there were no noticeable changes in tensile strength, length or flexibility.

EXAMPLE 3

Test blocks were prepared by adhering one treated yard and one untreated yarn to a block of tire rubber with a hot path. The rubber of the tire patch was vulcanized and the yarn was pulled from the test block using a Suter single-strand tester.

| Sample | Length of Test Area | Treated (oz.) | Untreated (oz.) |
|---|---|---|---|
| 1a | 1 inch | 118.4 | 64.0 |
| 1a | 1½ inch | 128.0 | 100.4 |
| 1a | 1¼ inch | 187.2 | 78.4 |
| 1b | 1 inch | 89.7 | 64.2 |
| 1d | 1 inch | 112.4 | 63.9 |
| 1e | 1 inch | 113.1 | 65.1 |
| 1e | 1 inch | 110.8 | 68.2 |
| 1f | 1 inch | 103.7 | 64.5 |
| 1g | 1 inch | 97.4 | 63.9 |
| 2a | 1 inch | 121.6 | 65.2 |
| 2b | 1 inch | 107.9 | 65.8 |
| 2c | 1 inch | 117.6 | 64.1 |
| 2e | 1 inch | 115.9 | 63.2 |
| 2f | 1 inch | 106.4 | 64.8 |
| 2g | 1 inch | 110.1 | 64.0 |

EXAMPLE 4

In order to determine the bond properties of the treated polyester when cemented between two rubber surfaces, a rubber patch was adhered to a second vulcanized rubber block with a resorcinol formaldehyde adhesive after a treated and untreated yarn were placed between the rubber patch and rubber block. The yarns were then pulled from the rubber sample with a Suter single-strand tester. The result of the test is as follows.

| Sample | Length of Test Area | Treated (oz.) | Untreated (oz.) |
|---|---|---|---|
| 1a | ¾ inch | 84.8 | 57.6 |
| 1a | 1 inch | 107.2 | 70.4 |
| 1a | 1½ inch | 118.4 | 84.8 |
| 1b | 1 inch | 110.5 | 69.5 |
| 2d | 1 inch | 118.2 | 72.1 |
| 2g | 1 inch | 97.8 | 70.5 |
| 1f | 1 inch | 108.5 | 71.8 |
| 1g | 1 inch | 101.1 | 69.9 |

EXAMPLE 5

Samples of yarn treated in accordance with Examples 1a–1g and 2a–2g were embedded in an uncured polychloroprene rubber in cylindrical molds 1½ inches high and one-half inch in diameter. Samples of untreated yarn were embedded in similar molds. The polychloroprene rubber was cured at room temperature for 96 hours in accordance with the manufacturer's instructions.

When it was attempted to remove the treated polyester from the mold, the yarn samples broke and did not release from the rubber. The untreated yarn was pulled from the samples with an average of 9.8 lbs.

What is claimed is:

1. The process for improving the adhesion of a synthetic linear polyester fiber to rubber comprising contacting said polyester fiber at a temperature of 120°–200° C. for $10^{-4}$–20 seconds with a member selected from the group consisting of (a) a halogenated aromatic hydrocarbon of the formula

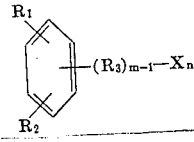

wherein $R_1$ and $R_2$ are the same or different and each stands for a member selected from the group consisting of hydrogen, alkyl having one to four carbons atoms and $R_1$ and $R_2$ when attached to each other and to vicinal carbon atoms together stand for a 5–6-membered ring, $R_3$ is an alkylene having one to four carbon atoms or phenylene, X is a halogen selected from the group consisting of, fluorine, chlorine, bromine and iodine, $n$ is a whole number from 1 to 3 and when $n$ is more than 1, X stands for the same or different halogens and $m$ is a whole number from 1 and 2 and (b) mixtures of said halogenated aromatic hydrocarbons and thereafter removing all or substantially all of said halogenated aromatic hydrocarbon from said polyester fiber.

2. The process according to claim 1 wherein contacting comprises immersing said polyester fiber in a liquid bath of said halogenated aromatic hydrocarbon.

3. The process according to claim 2 wherein said halogenated aromatic hydrocarbon is trichlorobenzene.

4. The process according to claim 2 wherein said halogenated aromatic hydrocarbon is extracted from said polyester fiber by a solvent which is miscible with said halogenated aromatic hydrocarbon.

5. The process according to claim 1 wherein said polyester fiber is contacted with said halogenated aromatic hydrocarbon in the vapor phase.

6. The process according to claim 5 wherein said halogenated aromatic hydrocarbon is heated to a temperature below the shrink or decomposition temperature of said polyester fiber.

7. The process according to claim 6 wherein said halogenated aromatic hydrocarbon and said polyester fiber differ in temperature such that the halogenated aromatic hydrocarbon vapor condenses on said polyester fiber during treatment.

8. The process according to claim 7 wherein said halogenated aromatic hydrocarbon is a member selected from the group consisting of monohalobenzene and dihalobenzene.

* * * * *